United States Patent
Burney et al.

(10) Patent No.: US 11,255,199 B2
(45) Date of Patent: Feb. 22, 2022

(54) AIRFOIL WITH SHAPED MASS REDUCTION POCKET

(71) Applicant: Rolls-Royce Corporation, Indianapolis, IN (US)

(72) Inventors: Dennes Kyle Burney, Indianapolis, IN (US); Jared J. Schneider, Zionsville, IN (US); Matthew J. Kappes, Greenwood, IN (US); Daniel Molnar, Lebanon, IN (US); Justin McKendry, Indianapolis, IN (US); Daniel Stratton, Indianapolis, IN (US); Matthew Jordan, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 16/879,292

(22) Filed: May 20, 2020

(65) Prior Publication Data
US 2021/0363889 A1 Nov. 25, 2021

(51) Int. Cl.
*F01D 5/22* (2006.01)
*F01D 25/06* (2006.01)

(52) U.S. Cl.
CPC ............ *F01D 5/225* (2013.01); *F01D 25/06* (2013.01)

(58) Field of Classification Search
None
See application file for complete search history.

(56) References Cited

U.S. PATENT DOCUMENTS

| | | | | |
|---|---|---|---|---|
| 3,383,093 A | * | 5/1968 | Howald | F01D 5/187 |
| | | | | 416/232 |
| 4,097,192 A | | 6/1978 | Kulina | |
| 4,118,147 A | * | 10/1978 | Ellis | F01D 5/16 |
| | | | | 416/230 |
| 4,726,737 A | * | 2/1988 | Weingold | B64C 11/18 |
| | | | | 416/223 A |
| 4,878,810 A | | 11/1989 | Evans | |
| 5,286,168 A | | 2/1994 | Smith | |
| 5,735,044 A | * | 4/1998 | Ferrigno | B23P 6/007 |
| | | | | 29/889.1 |
| 6,042,338 A | * | 3/2000 | Brafford | F01D 5/20 |
| | | | | 416/203 |
| 6,428,278 B1 | | 8/2002 | Montgomery et al. | |
| 7,033,131 B2 | | 4/2006 | Schreiber | |
| 7,147,437 B2 | | 12/2006 | Burdgick et al. | |
| 8,043,063 B2 | | 10/2011 | Kelly et al. | |
| 8,171,632 B2 | * | 5/2012 | Kuehhorn | B23P 15/006 |
| | | | | 29/889.23 |
| 8,241,003 B2 | | 8/2012 | Roberge | |
| 9,382,916 B2 | * | 7/2016 | Schoenenborn | F01D 5/005 |
| 9,932,840 B2 | | 4/2018 | Fulayter et al. | |
| 10,215,194 B2 | | 2/2019 | Theratil et al. | |

(Continued)

FOREIGN PATENT DOCUMENTS

FR 2944049 A1 * 10/2010 ............... F01D 5/16
WO 2006084438 8/2006

*Primary Examiner* — Michael Lebentritt
(74) *Attorney, Agent, or Firm* — Barnes & Thornburg LLP

(57) ABSTRACT

An airfoil includes a base, a tip, a suction side face, and a pressure side face. The pressure side face includes an outer surface, an inner surface located between the outer surface and the suction side face, and a transition surface that extends between and interconnects the outer surface and the inner surface so as to form a pocket in the airfoil.

20 Claims, 5 Drawing Sheets

(56) References Cited

U.S. PATENT DOCUMENTS

| | | | | |
|---|---|---|---|---|
| 10,823,203 | B2* | 11/2020 | Theratil | F01D 5/141 |
| 2002/0067991 | A1* | 6/2002 | Montgomery | F01D 5/16 |
| | | | | 416/203 |
| 2008/0014091 | A1 | 1/2008 | Gentile et al. | |
| 2008/0145228 | A1* | 6/2008 | Truckenmueller | F01D 5/141 |
| | | | | 416/203 |
| 2016/0290137 | A1 | 10/2016 | Li et al. | |
| 2017/0058680 | A1* | 3/2017 | Chouhan | F01D 5/20 |
| 2017/0254210 | A1* | 9/2017 | Barua | F01D 11/08 |
| 2019/0017385 | A1 | 1/2019 | Opoka et al. | |
| 2020/0256198 | A1* | 8/2020 | Akturk | F01D 5/20 |
| 2021/0062658 | A1* | 3/2021 | Place | F01D 5/187 |

* cited by examiner

AIRFOIL WITH SHAPED MASS REDUCTION POCKET

FIELD OF THE DISCLOSURE

The present disclosure relates generally to gas turbine engines, and more specifically to airfoils for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high-pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines adapted for use in certain aircraft, such as turbofan engines, typically include a rotating fan or rotor that draws ambient air into the engine and pushes a portion of the air onward into the compressor. Another portion of the air bypasses the compressor and remaining core of the engine in order to provide additional thrust. The fan may include a plurality of blades which, in addition to being able to withstand forces from inflowing air, are constructed to withstand high loads from the ingestion of foreign objects, such as birds, during flight that could potentially cause catastrophic damage to the blades and subsequently the engine.

Fan blades are also subject to natural vibrations caused by the interaction of the blades with the gases, such as ambient air, passing through the gas turbine engine. The specific susceptibility of a blade to vibrations may be increased if all the blades on a rotor are identical in terms of their vibration frequencies. Sometimes, intentional variations may be introduced into blades during manufacturing to create structural mistuning of a rotor and provide vibrational resistance.

SUMMARY

The present disclosure may comprise one or more of the following features and combinations thereof.

An airfoil adapted for use in a gas turbine engine may include a base, a tip spaced apart from the base radially relative to an axis, a suction side face that extends between the base and the tip, and a pressure side face. The tip may extend in a chordal direction between a leading edge and a trailing edge of the airfoil. The pressure side face may extend between the base and the tip opposite the suction side face. The pressure side face may include an outer surface, an inner surface located between the outer surface and the suction side face, and a transition surface that extends between and interconnects the outer surface and the inner surface of the pressure side face so as to form a pocket in the airfoil that opens into the tip of the airfoil.

In some embodiments, the transition surface may include a forward segment, an aft segment, and a join segment. The forward segment may extend substantially radially inward from the tip of the airfoil relative to the axis and may be located entirely chordally aft of a shock boundary of the airfoil. The aft segment may extend substantially radially inward from the tip of the airfoil and may be located a first distance chordally forward of the trailing edge of the airfoil may be equal to a range of thirty to forty percent of a chordal extent of the tip of the airfoil. The joint segment may interconnect the forward segment and the aft segment.

In some embodiments, the joint segment may include a first portion that extends radially inward and chordally aft away from the forward segment and a second portion that extends radially inward and chordally forward away from the aft segment toward the first portion such that the first portion and the second portion converge into one another such that the forward segment, the aft segment and the joint segment may delimit the inner surface in the chordal direction and in the radial direction away from the tip of the airfoil.

In some embodiments, the transition surface may further include a first junction segment located between and interconnecting the forward segment and the first portion of the joint segment, a second junction segment located between and interconnecting the aft segment and the second portion of the joint segment, and a third junction segment located between and interconnecting the first portion and the second portion of the joint segment.

In some embodiments, the forward segment, the aft segment, the first portion of the joint segment, and the second portion of the joint segment may be substantially linear. The first junction segment may be curved such that the forward segment, the first junction segment, and the first portion of the joint segment form a fillet shape. The second junction segment may be curved such that the aft segment, the second junction segment, and the second portion of the joint segment form a fillet shape. The third junction segment may be curved such that the first portion of the joint segment, the third junction segment, and the second portion of the joint segment form a fillet shape.

In some embodiments, the leading edge of the airfoil may define a top portion that extends from the tip of the airfoil a distance that is equal to a length of the forward segment. The forward segment may be substantially parallel with the top portion of the leading edge.

In some embodiments, the forward segment, the aft segment, the first portion of the joint segment, and the second portion of the joint segment may be substantially linear. The first junction segment may be linear such that the forward segment, the first junction segment, and the first portion of the joint segment form a substantially straight line. The second junction segment may be curved such that the aft segment, the second junction segment, and the second portion of the joint segment form a fillet shape. The third junction segment may be curved such that the first portion of the joint segment, the third junction segment, and the second portion of the joint segment form a fillet shape.

In some embodiments, the leading edge of the airfoil may be curved and define a top portion that has a radial extent from an outer end of the top portion located at the tip of the airfoil to an inner end of the top portion that is equal to a radial extent of the forward segment and the first portion of the joint segment. The forward segment and the first portion of the joint segment may be substantially parallel with a secant line of the curve of the leading edge that runs from the outer end of the top portion to the inner end of the top portion.

In some embodiments, a volume of the pocket may be defined between the outer surface, the inner surface, and the transition surface is sized such that a predetermined airfoil vibration frequency is achieved.

In some embodiments, the pocket may be formed such that the gas turbine engine in which the airfoil is adapted for use with meets regulations regarding bird strikes set forth in 14 C.F.R. Sec. 33.76.

In some embodiments, the pocket may be formed such that the gas turbine engine in which the airfoil is adapted for use with meets regulations regarding blade release set forth in 14 C.F.R. Sec. 33.94.

According to another aspect of the present disclosure, an airfoil adapted for use in a gas turbine engine may include a base, a tip spaced apart from the base radially relative to an axis, the tip extending in a chord direction between a leading edge and a trailing edge of the airfoil, and a first face. The first face may extend between the base and the tip and include an outer surface, a recessed inner surface, and a transition surface that extends between and interconnects the outer surface and the inner surface of the first face so as to form a pocket in the airfoil.

In some embodiments, the transition surface may include a forward segment, an aft segment, and a joint segment. The forward segment may extend radially inward from the tip of the airfoil relative to the axis and may be located entirely chordally aft of a shock boundary of the airfoil. The aft segment may be extends radially inward from the tip of the airfoil, and the joint segment may interconnect the forward segment and the aft segment.

In some embodiments, the airfoil may further include a suction side face that extends between the base and the tip of the airfoil and is located opposite the first face, wherein the first face is a pressure side face of the airfoil.

In some embodiments, the aft segment may be spaced apart chordally forward from the trailing edge of the airfoil by a distance equal to about thirty to forty percent of a length of the tip of the airfoil.

In some embodiments, the joint segment may include a first portion that extends radially inward and chordally aft away from the forward segment and a second portion that extends radially inward and chordally forward away from the aft segment toward the first portion such that the first portion and the second portion converge into one another.

In some embodiments, the transition surface may further include a first junction segment located between and interconnecting the forward segment and the first portion of the joint segment, a second junction segment located between and interconnecting the aft segment and the second portion of the joint segment, and a third junction segment located between and interconnecting the first portion and the second portion of the joint segment.

In some embodiments, the forward segment, the aft segment, the first portion of the joint segment, and the second portion of the joint segment may be substantially linear. The first junction segment may be curved such that the forward segment, the first junction segment, and the first portion of the joint segment form a fillet shape. The second junction segment may be curved such that the aft segment, the second junction segment, and the second portion of the joint segment form a fillet shape. The third junction segment may be curved such that the first portion of the joint segment, the third junction segment, and the second portion of the joint segment form a fillet shape.

In some embodiments, the leading edge of the airfoil may define a top portion that extends from the tip of the airfoil a distance that is equal to a length of the forward segment. The forward segment may be substantially parallel with the top portion of the leading edge.

According to another aspect of the present disclosure, a method may include providing an airfoil including a base, a tip spaced apart from the base radially relative to an axis, the tip extending in a chordal direction between a leading edge and a trailing edge of the airfoil, a suction side face that extends between the base and the tip, and a pressure side face that extends between the base and the tip opposite the suction side face. The method may further include determining a position of a shock boundary of the airfoil.

The method may further include removing a portion of the pressure side face of the airfoil so as to form an outer surface of the pressure side face, an inner surface of the pressure side face located between the outer surface and the suction side face, and a transition surface that extends between and interconnects the outer surface and the inner surface of the pressure side face such that the outer surface, the inner surface, and the transition surface form a pocket in the airfoil that opens into the tip of the airfoil, the transition surface including a forward segment that extends substantially radially inward from the tip of the airfoil relative to the axis and that is located entirely chordally aft of the shock boundary.

In some embodiments, the transition surface may further include an aft segment and a joint segment. The aft segment may extend radially inward from the tip of the airfoil and may be located a first distance chordally forward of the trailing edge of the airfoil that may be equal to a range of thirty to forty percent of a chordal extent of the tip of the airfoil. The joint segment may interconnect the forward segment and the aft segment, the joint segment may include a first portion that extends radially inward and chordally aft away from the forward segment and a second portion that may extend radially inward and chordally forward away from the aft segment toward the first portion such that the first portion and the second portion converge into one another.

In some embodiments, the removing may include removing a portion of the pressure side face so as to form the forward segment, the aft segment, and the joint segment of the pocket of the airfoil such that impact capabilities, weight reduction, and aerodynamic losses of the airfoil are optimized.

These and other features of the present disclosure will become more apparent from the following description of the illustrative embodiments.

DETAILED DESCRIPTION OF THE DRAWINGS

Figure 1:
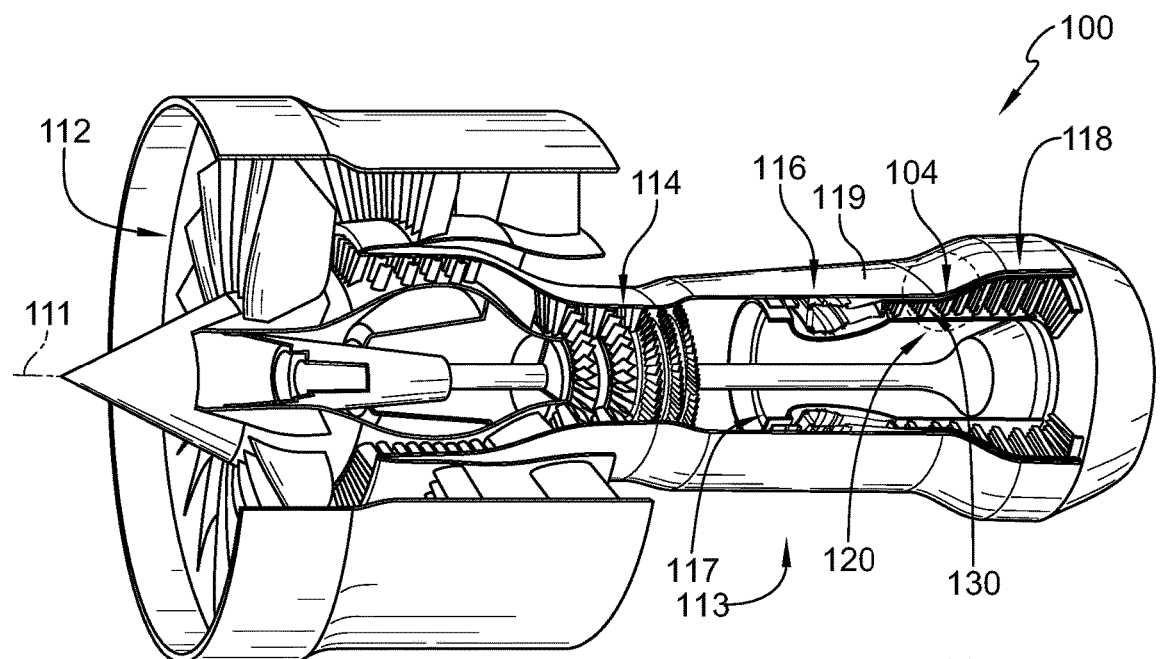
FIG. 1 is a cutaway view of a gas turbine engine that includes a fan, a compressor, a combustor, and a turbine, the fan having a rotor including a wheel arranged around an axis of the engine and a plurality of airfoils arranged around the wheel that each extend radially outward from the wheel to interact with gases flowing through the engine and suggesting that some of the fan airfoils include mistuning pockets configured to vary the resonance frequencies of the airfoils.

For the purposes of promoting an understanding of the principles of the disclosure, reference will now be made to a number of illustrative embodiments illustrated in the drawings and specific language will be used to describe the same.

Figure 2:
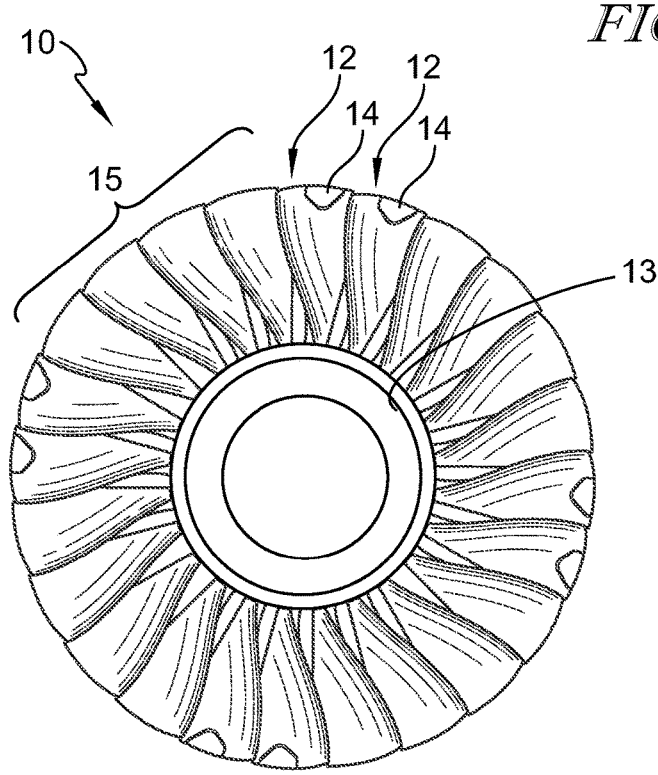
FIG. 2 is a rear elevation view of the plurality of airfoils included in the fan of FIG. 1 showing the fan includes airfoils having a hollowed-out pocket to vary their resonance frequency and other airfoils without a pocket and having resonance frequencies different than the airfoils with pockets.
Figure 3:
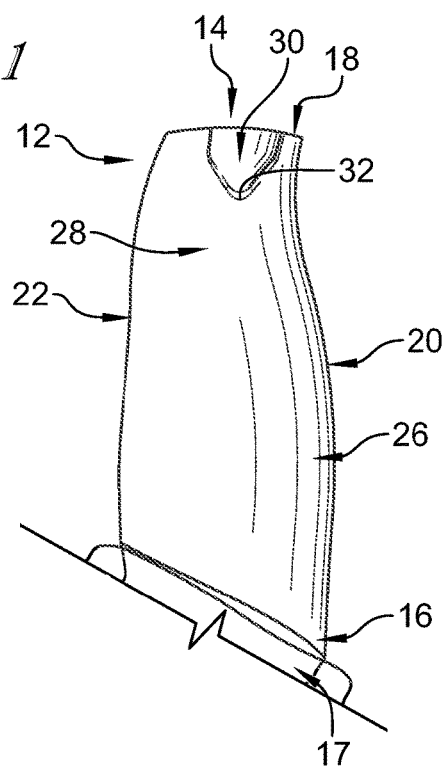
FIG. 3 is a rear elevation view of a single airfoil of the fan of FIGS. 1 and 2 showing the airfoil includes a base, a tip, a leading edge, a trailing edge, and a pocket formed near the tip that opens up into the tip of the airfoil and extends radially inward toward the base to vary the resonance frequency of the airfoil.

An airfoil 12 including a pocket 14 formed at a tip 18 of the airfoil 12 and adapted for use in a blade rotor assembly 10 is shown in FIGS. 2 and 3, and further suggested in various embodiments in FIGS. 4-8E. The blade rotor assembly 10 includes a plurality of the airfoils 12 including the pocket 14 and a plurality of airfoils 15 without the pocket 14 arranged circumferentially around a central wheel 13.

The pocket 14 is formed in each airfoil 12 to reduce the weight of the airfoil 12, while also mitigating aerodynamic performance loss due to the removal of material of the airfoil and maximizing impact capabilities of the airfoil 12 when impacted by foreign objects, such as bird strikes. Specifically, the airfoil 12 is constructed to be structurally and operably tolerant to at least meet government regulations regarding foreign object ingestion and/or bird strikes while still including the mass reduction and vibration response altering pocket 14.

Figure 5:
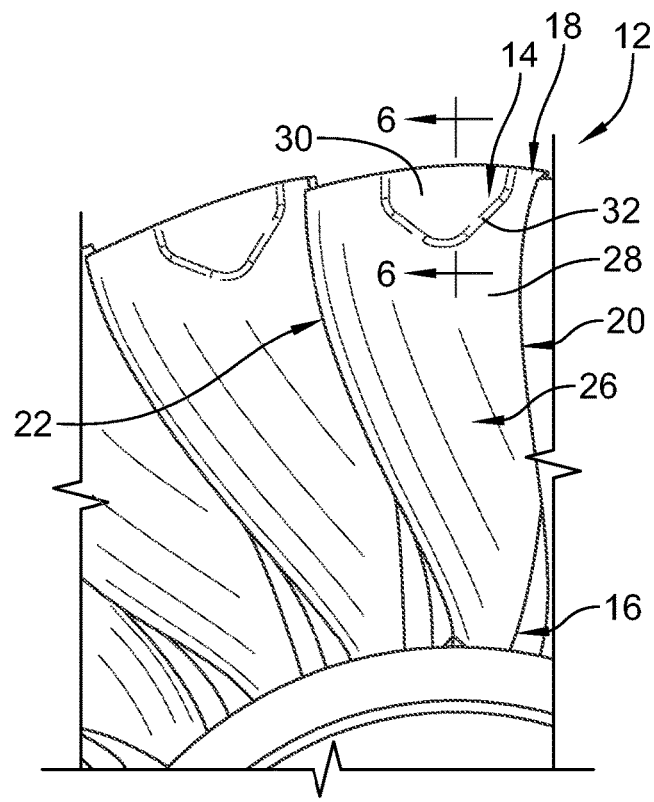
FIG. 5 is a front elevation view of a portion of the plurality of airfoils of FIGS. 1-4 showing the two airfoils including the pocket of FIGS. 1-4 arranged adjacent to one another.

The pocket 14 also improves vibration behavior of the airfoil 12, in particular by adjusting the vibration frequencies of the airfoil 12, such that the vibration of the plurality of airfoils 12, 15 of the rotor assembly 10 may be finely controlled. For example, as shown in FIG. 2, the rotor assembly 10 includes an alternating pattern of airfoils. In particular, the rotor assembly 10 includes two airfoils 12 having a first airfoil frequency arranged adjacent to one another, as shown in FIGS. 2 and 5, followed by four airfoils 15 having a second airfoil frequency following the airfoils 12 in the circumferential direction, as shown in FIG. 2. This arrangement exemplifies one of the methods in which a predetermined blade rotor vibration frequency or mistuning of the airfoils 12, 15 of the rotor assembly 10 may be achieved. Many other pattern arrangements of mistuned airfoils are possible.

The airfoil 12, as included in the exemplary blade rotor assembly 10, is adapted for use in a gas turbine engine 100, shown in FIG. 1. The gas turbine engine 100 includes a fan 112, a compressor 114, a combustor 116, a turbine 118, and a turbine case 119, as shown in FIG. 1. The compressor 114, the combustor 116, and the turbine 118 may define an engine core 113. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about a central axis 111 of the gas turbine engine 100 and drive the compressor 114 and the fan 112.

The turbine 118 includes a turbine case 119, a plurality of rotating turbine wheel assemblies 120, and a plurality of stator vane assemblies 130 that are fixed relative to the central axis 111, as suggested in FIG. 1. The hot gases are conducted through a gas path 117 and interact with the turbine wheel assemblies 120 to cause the turbine wheel assemblies 120 to rotate about the central axis 111. The plurality of stator vane assemblies 130 are positioned so as to direct the gases toward the turbine wheel assemblies 120 at a desired angle.

In the illustrative embodiment, the airfoil 12 is adapted for use in the fan 112 of the gas turbine engine 100. In particular, the fan 112 includes the blade rotor assembly 10 having an alternating pattern of airfoils 12 with a pocket 14 and airfoils 15 without pockets in order to achieve a predetermined blade rotor vibration frequency while also minimizing aerodynamic losses and maximizing impact capabilities in order to meet government regulations regarding foreign object ingestion, in particular regarding blade release and/or bird strikes. In other embodiments, the airfoil 12 is adapted for use in other components of the gas turbine engine 100, such as portions of the compressor 114 and the turbine 118.

Figure 4:
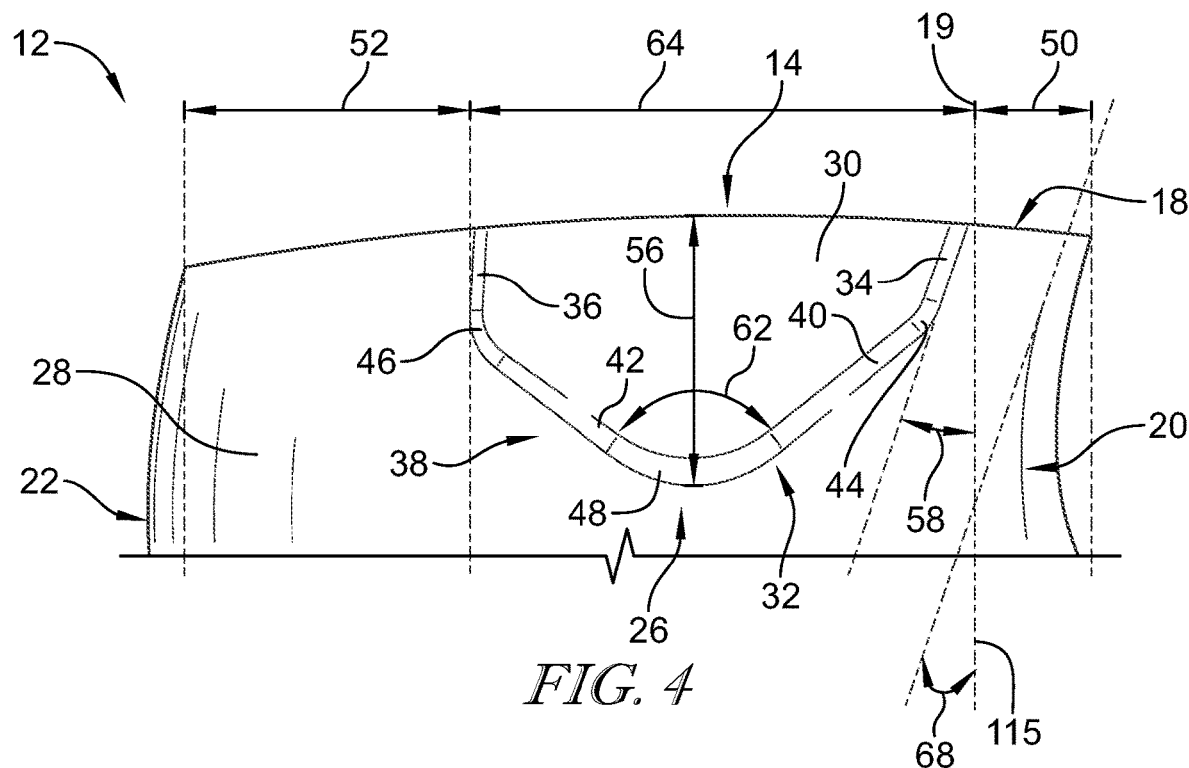
FIG. 4 is an enlarged view of the pocket of the airfoil of FIGS. 1-3 showing that the airfoil further includes an outer surface, an inner surface, and a transition surface located on a pressure side surface of the airfoil, the pocket being formed to vary the resonance frequency while allowing the airfoil to meet government regulations such as regulations involving bird strikes and blade release scenarios.
Figure 6:
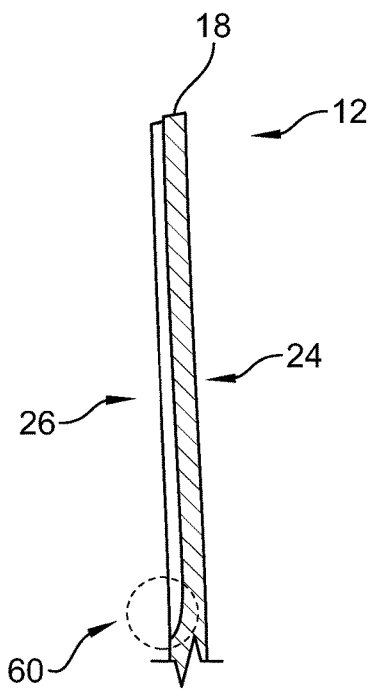
FIG. 6 is a side cross sectional view taken along line 6 of the airfoil of FIG. 5 showing the pressure side surface formed to include the pocket, a suction side surface of the airfoil, the tip, and a sloped portion of the transition surface.

As shown in FIG. 3 and further detailed in FIGS. 4-6, the airfoil 12 includes a base 16 located radially inward towards the axis 111 and a tip 18 spaced radially outward away from the base 16. The base 16 and the tip 18 extend in a chordal direction of the airfoil 12 between a leading edge 20 of the airfoil 12 and a trailing edge 22 of the airfoil 12. The base 16 is attached to a root 17 for mounting the airfoil 12 on the wheel 13 of the blade rotor assembly 10. Specifically, the root 17 is shaped to be received in a corresponding slot in the wheel 13 to couple the airfoil 12 to the wheel 13. In other embodiments, the rotor assembly 10 is a blisk and the airfoils 12 are integrally formed with the wheel 13.

The airfoil 12 has an aerodynamic outer shape for accelerating air through the gas turbine engine 100, as suggested in FIGS. 2, 3, 5, and 6. Specifically, the airfoil 12 includes a suction side surface 24 and a pressure side surface 26 including an outer surface 28 that form the aforementioned aerodynamic outer shape and each extend between the base 16 and the tip 18 of the airfoil 12. The suction side surface 24 is located on the airfoil 12 opposite the pressure side surface 26.

In some embodiments, the airfoil 12 includes high-strength plastics or polymers, such as carbon fiber reinforced plastic. In some embodiments, the airfoil 12 may comprise metals, such as titanium, aluminum, stainless steel, or a combination of metals and plastics/polymers. It can also be envisioned that the airfoil 12 includes ceramic matrix composite materials that optimize airfoil 12 performance in other related applications.

As can be seen in detail in FIGS. 3 and 4, the airfoil 12 further includes an inner surface 30 and a transition surface 32 located on the pressure side of the airfoil 12 that together form the hollowed-out pocket 14. The inner surface 30 is located between the outer surface 28 of the pressure side surface 26 and the suction side surface 24. The transition surface 32 extends between and interconnects the outer surface 28 and the inner surface 30. The transition surface 32 also extends around the perimeter of the inner surface 30 so as to bound the inner surface 30 and form the pocket 14. In the illustrative embodiment as shown in FIGS. 1-6, the transition surface 32 extends around the perimeter of inner surface 30 except for the edge of the inner surface that lies on the tip 18 of the airfoil 12 such that the pocket 14 opens into the tip 18 of the airfoil 12. In other embodiments, for example as shown in FIG. 8B, the transition surface 32 extends completely around the entire perimeter of inner surface 30 such that the pocket 14 does not open into the tip 18 of the airfoil 12.

As discussed above, the pocket 14 of the airfoil 12 is sized to reduce the weight of the airfoil 12, while also mitigating aerodynamic performance loss due to the removal of material of the airfoil 12 and maximizing impact capabilities of the airfoil 12 when impacted by foreign objects, such as bird strikes. The shape of the pocket 14 also influences vibrational frequencies of the airfoil 12 such that a blade rotor assembly 10 including the airfoil 12 can be accurately mistuned to a desired level.

The pocket 14 is further shaped such that the airfoil 12 and engine 100 pass government blade release (sometimes called "blade off") standards. That is, in situations where one of the blades 14 is separated from the wheel 13, the blade 14 is to be contained satisfactorily by the engine 100. Pockets of certain shapes and sizes were shown to cause the blade to break apart or move in such a manner to not satisfy the blade release standard in computer simulations. The pockets 14 of the present disclosure are sized, shaped, and located such that the blades 12 satisfy the blade release standards.

In order to achieve the optimal shape to realize the aforementioned benefits, the pocket 14 is sized to include an optimized chordal extent, an optimal face location, an optimized radial extent, an optimized depth, and an optimized stress distribution. Specifically, the chordal extent of the pocket 14 is sized so as to not interfere with an aerodynamic shock boundary 19 of the airfoil 12. During high speed operation of the gas turbine engine 100, oblique shock waves may occur near or at the pressure side of the airfoil and reflect between the casing and the tip of the airfoil. The boundary of this shock wave should not be interfered with by structural modifications of the airfoil, and accordingly, the pocket 14 in the illustrative embodiments is sized to be chordally aft of the shock boundary 19 of the airfoil 12 as suggested in FIG. 4.

The chordal extent of the pocket 14 is selected as to not negatively affect the impact capabilities of the airfoil 12 such that the airfoil 12 is at least capable of meeting government regulations regarding foreign object ingestion, in particular bird strikes and blade release. For example, the Federal Aviation Administration (FAA) of the United States maintains regulations which require that, before a new engine model can be mounted on planes, it is proven in a test facility that it is designed and constructed to be structurally and operationally tolerant, to the degree specified, after the ingestion of artificial birds or devices which simulate the mass, shape, density, and impact effects of birds weighing from 0.77 to 8.03 lbs. (0.35 to 3.65 kg.). (14 C.F.R. Sec. 33.76.) Moreover, tests are conducted reproducing scenarios in which compressor or fan blades break off within the engine in order to determine if the engine can survive such an event. (14 C.F.R Sec. 33.94.) Other governments around the world provide similar standards for aircraft gas turbine engines. The pocket 14 may be sized to not only meet but to surpass such government standards regarding blade impacts by foreign objects, while maximizing impact capabilities, maximizing weight reduction, and minimized aerodynamic losses.

The face of the airfoil 12 on which the pocket 14 is formed is optimized for the specific needs of the airfoil 12 and the gas turbine engine 100 in which the airfoil 12 will be used. For example, in specific applications such as the embodiments shown in FIGS. 2-8E, the pocket 14 is positioned on the pressure side surface of the airfoil. Positioning the pocket 14 on the pressure side for these specific applications minimizes aerodynamic disruptions when compared to the suction side face of the airfoil. In other applications, the pocket is positioned on the suction side surface of the airfoil.

A radial extent 56 of the pocket 14 may be optimized for impact capabilities of the airfoil 12. Specifically, the radial extent 56 of the pocket 14 is sized to maximize the weight reduction of the airfoil 12 while at the same time minimizing impact capability losses of the airfoil 12. Thus, the radial extent 56 of the pocket 14 may be sized based on the particular application in which the airfoil 12 is being used. For example, in the embodiment shown in FIGS. 1-6, the radial extent 56 of the pocket 14 is sized to be at a plastic strain limit of the material of the airfoil.

Similarly, the depth of the pocket 14, which generally refers to the width of the transition surface 32, may be sized to maximize weight reduction while minimizing the impact capability losses of the airfoil. Thus, the depth of the pocket 14 may be based on the particular application in which the airfoil 12 is being used. Moreover, the geometry of the pocket 14 is designed such that the maximum weight reduction is located towards the tip 18 of the airfoil 12. Because impact capabilities of the airfoil 12 are reduced as the radial extent 56 increases, specifically downwardly towards the base 16, a larger percentage of material of the airfoil 12 may be removed to form the pocket 14 closer to the tip 16 than further radially inward. For example, in at least one embodiment which will be described below, the pocket 14 includes a larger upper rectangular portion and a smaller radially inward triangular portion so as to form a trapezoid, thus maximizing weight reduction while minimizing impact capability losses.

The pocket 14 is sized for optimal stress distribution. For example, in the embodiment discussed in the preceding paragraph, the trapezoidal shape serves to further optimize weight reduction toward the furthest radial extent possible while also minimizing stress concentration features which can have a negative impact on the impact capability of the airfoil during medium bird loading.

The optimization parameters discussed above will be discussed in reference to the embodiments described in detail below. These parameters are not exhaustive, as other parameters may be taken into consideration in the sizing of the pocket 14. At least some of the embodiments described below optimize the parameters discussed above, while other embodiments may not optimize every parameter but may be necessary for certain applications of the airfoil described.

In the illustrative embodiment, the pocket 14 includes a generally optimal shape and size that realizes the benefits discussed above, in particular a trapezoidal shape as shown in FIGS. 2-5. The trapezoidal shape is defined by the shape of the inner surface 30 and the transition surface 32. As shown in detail in FIG. 4, the transition surface 32 extends around the perimeter of the inner surface 30 except for the upper edge of the inner surface 30 that lies on the tip 18 of the airfoil 12. In other embodiments, only portions of the perimeter of the inner surface 30 include the transition surface 32.

As shown in FIG. 6, the transition surface 32 has a width that results in a constant thickness of the remaining material of the airfoil 12 after the material of the pocket 14 has been removed. In the illustrative embodiment, the majority of the transition surface 32 has a constant thickness. The width of a sloped portion 60 of the transition surface 32 may be larger in order to accommodate for the slope extending between the outer and inner surfaces 28, 30 in order to maintain a constant thickness of the pocket 14. The portion of the airfoil 12 located between the inner surface 30 and the suction side surface 24 is solid, as shown in FIG. 6. Furthermore, the overall thickness of the pocket 14 may be optimized in regards to the factors discussed above, including government regulations, impact capabilities, and weight reduction.

Referring to FIG. 4, the transition surface 32 includes a forward segment 34, an aft segment 36, and a joint segment 38. The forward segment 34 extends substantially radially inward from the tip 18 of the airfoil 12 toward the base 16. In the illustrative embodiment, the forward segment 34 extends substantially radially but slightly slanted inwardly so as to form an angle 58 relative to a vertical axis 115 that extends perpendicularly away from the axis 111 of the engine 100. In other embodiments in which the airfoil 12 may be used for different applications, the forward segment 34 extends parallel with the vertical axis 115.

In the illustrative embodiment, the leading edge 20 of the airfoil 12 includes a top portion formed at the top of leading edge 20 and extending away from the tip 18. The top portion is generally linear and is approximately equal in length to the forward segment 34. The forward segment 34 is angled away from the vertical axis 115 such that the angle 58 formed between the forward segment 34 and the vertical axis 115 is approximately equal to an angle 68 formed between the longitudinal extent of the top portion and the vertical axis 115. In other embodiments, the two angles 58, 68 are not equal, such as the embodiment in which the forward segment 34 is parallel with the vertical axis 115.

The forward segment 34 is also located entirely chordally aft of the shock boundary 19 of the airfoil 12. As discussed above, the shock boundary 19 should not be interfered with by any structural modifications of the airfoil 12 so as to not interfere with efficient operation of the gas turbine engine 100. Accordingly, the forward segment 34, and as a result the entire pocket 14, is positioned to be chordally aft of the shock boundary 19. In the illustrative embodiment, the shock boundary 19 is approximately located at the vertical axis 115 shown in FIG. 4, which is located chordally aft a first distance 50 away from the point at which the leading edge 20 and the tip 18 of the airfoil 12 meet.

Similarly, the aft segment 36 extends substantially radially inward from the tip 18 of the airfoil 12. In the illustrative embodiment, the aft segment 36 extends nearly parallel with the vertical axis 115, but may extend with a greater or lesser slant relative to the vertical axis 115 in other embodiments. The aft segment 36 is located a second distance 52 chordally forward of the trailing edge 22 of the airfoil 12. As shown in FIG. 4, the second distance 52 is equal to approximately 30 to 40 percent of the entire chordal extent 64 of the tip 18 of the airfoil 12. This positioning of the aft segment 36, as well as the positioning of the forward segment 34 discussed above, contribute to the overall performance optimization of the pocket 14.

The joint segment 38 is located radially inward of the forward and aft segments 34, 36 and interconnects the forward segment 34 and the aft segment 36, as shown in FIG. 4. The joint segment 38 includes a first portion 40 that extends radially inward and chordally aft away from the forward segment 34 and a second portion 42 that extends radially inward and chordally forward away from the aft segment 36 toward the first portion 40. As a result, the first portion 40 and the second portion 42 converge into one another to define angle 62. In the illustrative embodiment, the angle 62 is approximately 120 degrees. The angle 62 may be different in other embodiments in order to accommodate the needs and or optimization parameters for other applications.

The transition surface 32 further includes a first junction segment 44, a second junction segment 46, and a third junction segment 48, as shown in FIG. 4. The first junction segment 44 is located between and interconnects the forward segment 34 and the first portion 40 of the joint segment 38. The second junction segment 46 is located between and interconnects the aft segment 36 and the second portion 42 of the joint segment 38. The third junction segment 48 is located between and interconnects the first portion 40 and the second portion 42 of the joint segment 38.

Each junction segment 44, 46, 48 is curved, as shown in FIG. 4. As a result (i) the forward segment 34, the first junction segment 44, and the first portion 40 of the joint segment 38 form a fillet shape, (ii) the aft segment 36, the second junction segment 46, and the second portion 42 of the joint segment 38 form a fillet shape, and (iii) the first portion 40 of the joint segment 38, the third junction segment 48, and the second portion 42 of the joint segment 38 form a fillet shape. In other embodiments, each junction segment 44, 46, 48 may be a sharp corner, or a sloped corner. It can also be envisioned that a combination of junction segments may be used as needed for some applications, such as one curved and two sharp corner junctions.

Accordingly, the forward segment 34, the aft segment 36, the joint segment 38, and the first, second, and third junction segments 44, 46, 48 delimit the inner surface 30 in the chordal direction and in the radial direction away from the tip of the airfoil 12, and as such, form the pocket 14. As discussed above, the dimensions of each of the forward segment 34, the aft segment 36, the joint segment 38, and the first, second, and third junction segments 44, 46, 48 are optimized such that the airfoil meets government regulations regarding foreign object ingestion, as well as maximizing impact capabilities, maximizing weight reduction, and minimized aerodynamic losses.

In the illustrative embodiment, the length of the forward segment 34 is approximately equal to the length of the aft segment 36, as shown in FIG. 4. The length of the first portion 40 of the joint segment 38 is slightly greater than the length of the second portion 42. The radial extent 56 of the pocket 14 is approximately half of a maximum chordal extent 64 of the pocket 14. Each of these dimensions may be modified in other embodiments in order to meet other applications of the airfoil 12 while simultaneously meeting government regulations, maximizing impact capabilities, maximizing weight reduction, and minimized aerodynamic losses.

The dimensions of the pocket 14 are also sized to meet predetermined vibration frequency or mistuning values for the airfoil 12. For example, in the illustrative embodiment, the pocket 14 of FIGS. 1-6 is sized to meet a desired frequency change between airfoils 12 and airfoils 15 as arranged on the blade rotor assembly 10. As shown in FIG. 2, the desired frequency change is achieved with a pattern of two airfoils 12 with the pocket 14 followed by four airfoils 15 without the pocket 14. Other arrangements or patterns of airfoils 12, 15 may be utilized to achieve desired vibration frequency or mistuning effects based on the application, such as alternating between airfoils with and without the pocket, including four airfoils 12 with the pocket 14 symmetrically around the rotor assembly 10, or including alternating three airfoils 12 with the pocket 14 and three airfoils 15 without the pocket 14 around the rotor assembly 10.

Figure 7:
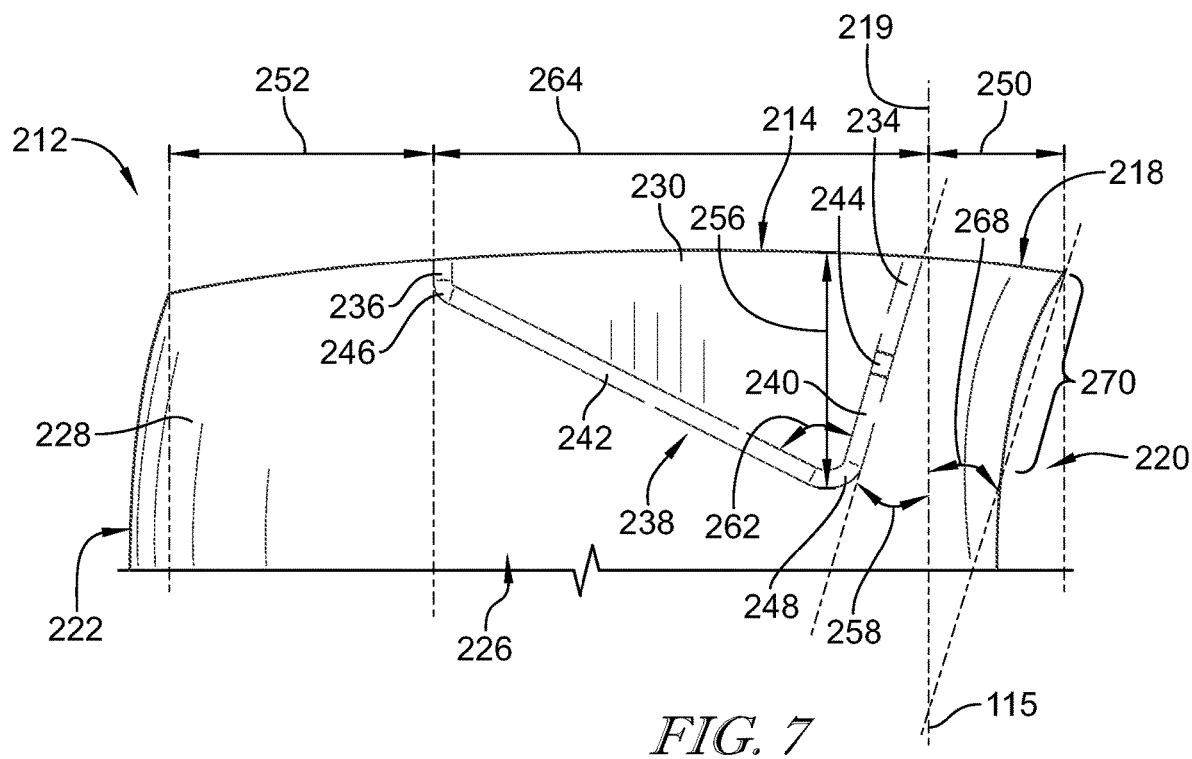
FIG. 7 is another embodiment of an airfoil for use in the gas turbine engine of FIG. 1 showing the airfoil includes a base, a tip, a leading edge, a trailing edge, and a pocket formed near the tip that extends radially inward toward the base, and suggesting that the pocket has a generally triangular shape.

Another embodiment of an airfoil 212 for use in the rotor assembly 10 in accordance with the present disclosure is shown in FIG. 7. The airfoil 212 is substantially similar to the airfoil 12 shown in FIGS. 1-6 and described herein, but includes a modified pocket 214. Accordingly, similar reference numbers in the 200 series indicate features that are common between the airfoil 212 and the airfoil 12. The description of the airfoil 12 is incorporated by reference to apply to the airfoil 212, except in instances when it conflicts with the specific description and the drawings of the airfoil 212.

Like the airfoil 12, the airfoil 212 includes a base 216 (not shown) located radially inward towards the axis 111 and a tip 218 spaced radially outward away from the base 216. The base 216 and the tip 218 extend in a chordal direction of the airfoil 212 between a leading edge 220 of the airfoil 212 and a trailing edge 222 of the airfoil 212. The airfoil 212 further includes a suction side surface 224 and a pressure side surface 226 including an outer surface 228 that each extend between the base 216 and the tip 218 of the airfoil 212.

The airfoil 212 further includes an inner surface 230 and a transition surface 232 located on the pressure side 226 of the airfoil 212 that together form a hollowed-out pocket 214, as shown in FIG. 7. The pocket 214 includes another generally optimal shape and size that realizes the benefits discussed above, in particular a generally triangular shape. This triangular shape is defined by the shape of the inner surface 230 and the transition surface 232. As shown in detail in FIG. 7, the transition surface 232 extends around the perimeter of the inner surface 230 except for the upper edge of the inner surface 230 that lies on the tip 218 of the airfoil 212.

Similarly to the airfoil 12, the transition surface 232 of the airfoil 212 includes a forward segment 234, an aft segment 236, and a joint segment 238. The forward segment 234 extends substantially radially inward from the tip 218 of the airfoil 212 toward the base 216 and is located chordally aft of the shock boundary 219 at axis 115. In the illustrative embodiment, the forward segment 234 extends substantially radially but slightly slanted inwardly so as to form an angle 258 relative to the vertical axis 115, as will be described further below. The aft segment 236 is located a second distance 252 chordally forward of the trailing edge 222 of the airfoil 212 equal to approximately 30 to 40 percent of the entire chordal extent 264 of the tip 218 of the airfoil 212.

The joint segment 238 is located radially inward of the forward and aft segments 234, 236 and interconnects the forward segment 234 and the aft segment 236, as shown in FIG. 7. The joint segment 238 includes a first portion 240 that extends substantially radially inward away from the forward segment 234 and a second portion 242 that extends radially inward and chordally forward away from the aft segment 236 toward the first portion 240. As a result, the first portion 240 and the second portion 242 converge into one another to define angle 262. In the illustrative embodiment, the angle 262 is approximately 80 degrees.

The transition surface 232 further includes a first junction segment 244, a second junction segment 246, and a third junction segment 248, as shown in FIG. 7. The first junction segment 244 is located between and interconnects the forward segment 234 and the first portion 240 of the joint segment 238. The second junction segment 246 is located between and interconnects the aft segment 236 and the second portion 242 of the joint segment 238. The third junction segment 248 is located between and interconnects the first portion 240 and the second portion 242 of the joint segment 238.

As shown in FIG. 7, the first junction segment 244 is linear and each of the second and third junction segment 246, 248 is curved. As a result (i) the forward segment 234, the first junction segment 244, and the first portion 240 of the joint segment 238 form a straight line, (ii) the aft segment 236, the second junction segment 246, and the second portion 242 of the joint segment 238 form a fillet shape, and (iii) the first portion 240 of the joint segment 238, the third junction segment 248, and the second portion 242 of the joint segment 238 form a fillet shape. As can be seen in FIG. 7, the entirely straight segment formed by the forward segment 234, the first junction segment 244, and the first portion 240 is substantially parallel with a secant line 270 of the curve of the leading edge 220 that runs from the outer end of a top portion of the leading edge to the inner end of the top portion.

Accordingly, the forward segment 234, the aft segment 236, the joint segment 238, and the first, second, and third junction segments 244, 246, 248 delimit the inner surface 230 in the chordal direction and in the radial direction away from the tip of the airfoil 212, and as such, form the pocket 214. The dimensions of each of the forward segment 234, the aft segment 236, the joint segment 238, and the first, second, and third junction segments 244, 246, 248 are optimized such that the airfoil meets government regulations regarding foreign object ingestion, as well as maximizing impact capabilities, maximizing weight reduction, and minimized aerodynamic losses.

In the illustrative embodiment, the length of the forward segment 234 is approximately three times the length of the aft segment 236, as shown in FIG. 7. The length of the first portion 240 of the joint segment 238 is approximately a quarter of the length of the second portion 242. The radial extent 256 of the pocket 214 is approximately half the length of the second portion 242.

Figure 8A:
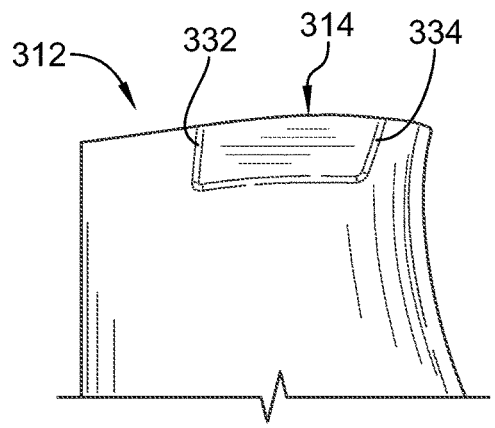
FIG. 8A is another embodiment of an airfoil for use in the gas turbine engine of FIG. 1 showing the airfoil includes a base, a tip, a leading edge, a trailing edge, and a pocket formed near the tip that extends radially inward toward the base, and showing that the pocket has a generally rectangular shape with a sloped forward segment.
Figure 8B:
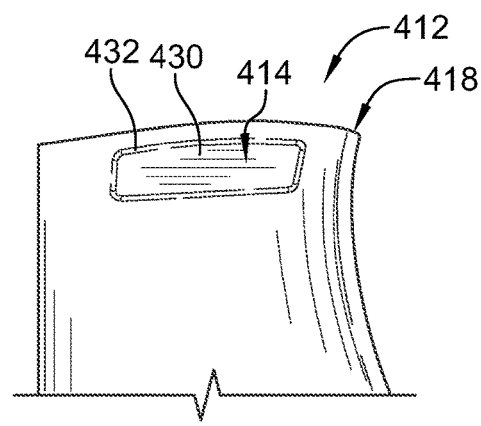
FIG. 8B is another embodiment of an airfoil for use in the gas turbine engine of FIG. 1 showing the airfoil includes a base, a tip, a leading edge, a trailing edge, and a pocket formed near the tip that extends radially inward toward the base, and showing that the pocket has a generally rectangular shape that does not open up into the tip of the airfoil.

Further embodiments of the airfoil 12 are shown in FIGS. 8A-8E. FIG. 8A shows a third embodiment of an airfoil 312 for use in the rotor assembly 10 in accordance with the present disclosure. The airfoil 312 is substantially similar to the airfoil 12 shown in FIGS. 1-6 and described herein, but includes a modified pocket 314. As can be seen in FIG. 8A the pocket 314 is similar to the pocket 14, but instead includes a generally rectangular shape without the lower triangular portion of the pocket 14 described above. The pocket 314 does include a sloped forward segment 334 of a transition surface 332 of the airfoil 312 similar to the forward segment 34 described above. As such, the design of this pocket 314 has different properties from the pocket 14 of FIGS. 1-6 that may affect optimization of the parameters discussed above. Nevertheless, the pocket 314 effectively optimized the parameters while simultaneously meeting the needs of the particular applications that this airfoil 312 and pocket 314 will be used in.

FIG. 8B shows a fourth embodiment of an airfoil 412 for use in the rotor assembly 10 in accordance with the present disclosure. The airfoil 412 is substantially similar to the airfoil 12 shown in FIGS. 1-6 and described herein, but includes a modified pocket 414. As can be seen in FIG. 8B the pocket 414 is similar to the pocket 14, but instead includes a generally rectangular shape without the lower triangular portion of the pocket 14. Moreover, the pocket 414 does not extend and open up into the tip 418. Instead, a transition surface 432 of the pocket 414 extends completely around the perimeter of an inner surface 430 of the pocket 414. As such, the design of this pocket 414 has different properties from the pocket 14 of FIGS. 1-6 that may affect optimization of the parameters discussed above. Nevertheless, the pocket 414 effectively optimized the parameters while simultaneously meeting the needs of the particular applications that this airfoil 412 and pocket 414 will be used in.

Figure 8C:
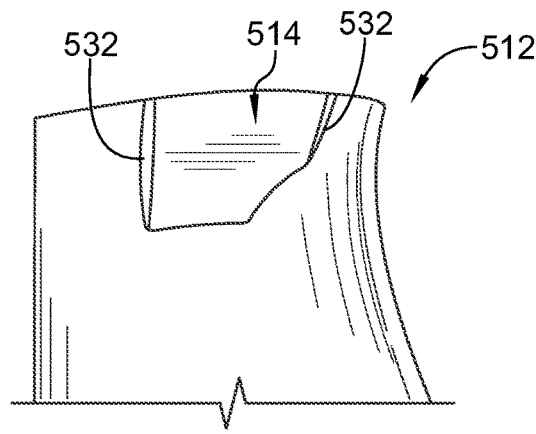
FIG. 8C is another embodiment of an airfoil for use in the gas turbine engine of FIG. 1 showing the airfoil includes a base, a tip, a leading edge, a trailing edge, and a pocket formed near the tip that extends radially inward toward the base, and showing that the pocket has a generally rectangular shape including a sloped bottom corner.

FIG. 8C shows a fifth embodiment of an airfoil 512 for use in the rotor assembly 10 in accordance with the present disclosure. The airfoil 512 is substantially similar to the airfoil 12 shown in FIGS. 1-6 and described herein, but includes a modified pocket 514. As can be seen in FIG. 8C the pocket 514 is similar to the pocket 14, but does not include the lower left triangular portion of the trapezoidal shape of the pocket 14 described above. Moreover, the pocket 514 includes a sloped transition from the tip to the inner radial extent of the pocket 514. In other words, the pocket 514 includes two transition surfaces 532 on the radially extending sides of the pocket 514. Each transition surface 532 is largest at the tip of the airfoil 512, and reduces in size in the radial direction such that the pocket 514 is sloped toward the outer surface and such that the innermost radial side of the pocket 514 is flush with the outer surface of the airfoil 512. Accordingly, the design of this pocket 514 has different properties from the pocket 14 of FIGS. 1-6 that may affect optimization of the parameters discussed above. Nevertheless, the pocket 514 effectively optimized the parameters while simultaneously meeting the needs of the particular applications that this airfoil 512 and pocket 514 will be used in.

Figure 8D:
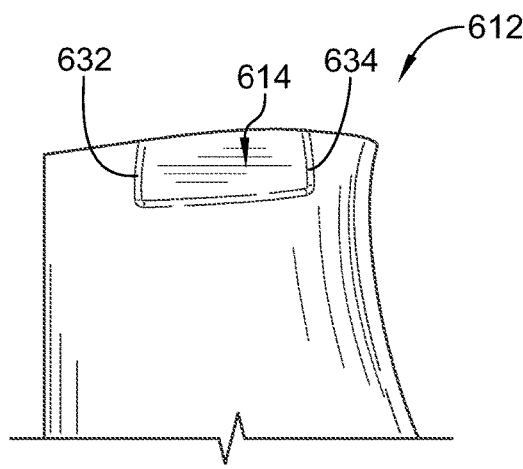
FIG. 8D is another embodiment of an airfoil for use in the gas turbine engine of FIG. 1 showing the airfoil includes a base, a tip, a leading edge, a trailing edge, and a pocket formed near the tip that extends radially inward toward the base, and showing that the pocket has a generally rectangular shape.

FIG. 8D shows a sixth embodiment of an airfoil 612 for use in the rotor assembly 10 in accordance with the present disclosure. The airfoil 612 is substantially similar to the airfoil 12 shown in FIGS. 1-6 and described herein, but includes a modified pocket 614. As can be seen in FIG. 8D the pocket 614 is similar to the pocket 14, but instead includes a generally rectangular shape without the lower triangular portion of the pocket 14 described above. The pocket 614 also does not include a sloped forward segment 634 of a transition surface 632 of the airfoil 612, but instead includes a straight forward segment 634 parallel with the vertical axis 115. As such, the design of this pocket 614 has different properties from the pocket 14 of FIGS. 1-6 that may affect optimization of the parameters discussed above. Nevertheless, the pocket 614 effectively optimized the parameters while simultaneously meeting the needs of the particular applications that this airfoil 612 and pocket 614 will be used in.

Figure 8E:
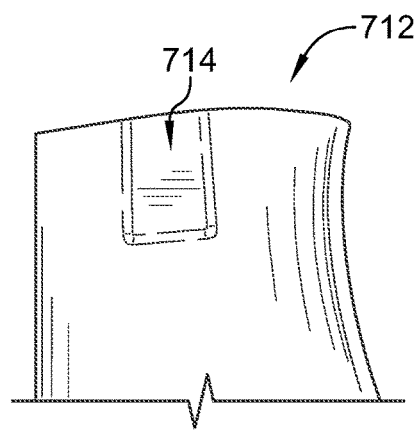
FIG. 8E is another embodiment of an airfoil for use in the gas turbine engine of FIG. 1 showing the airfoil includes a base, a tip, a leading edge, a trailing edge, and a pocket formed near the tip that extends radially inward toward the base, and showing that the pocket has a generally narrow rectangular shape.

FIG. 8E shows a seventh embodiment of an airfoil 712 for use in the rotor assembly 10 in accordance with the present disclosure. The airfoil 712 is substantially similar to the airfoil 12 shown in FIGS. 1-6 and the airfoil 612 shown in FIG. 8D and described herein, but includes a modified pocket 714. As can be seen in FIG. 8E the pocket 714 is similar to the pocket 614, but instead includes a narrower rectangular shape as compared to the pocket 614 described above. As such, the design of this pocket 714 has different properties from the pocket 14 of FIGS. 1-6 that may affect optimization of the parameters discussed above. Nevertheless, the pocket 714 effectively optimized the parameters while simultaneously meeting the needs of the particular applications that this airfoil 712 and pocket 714 will be used in.

Figure 9:
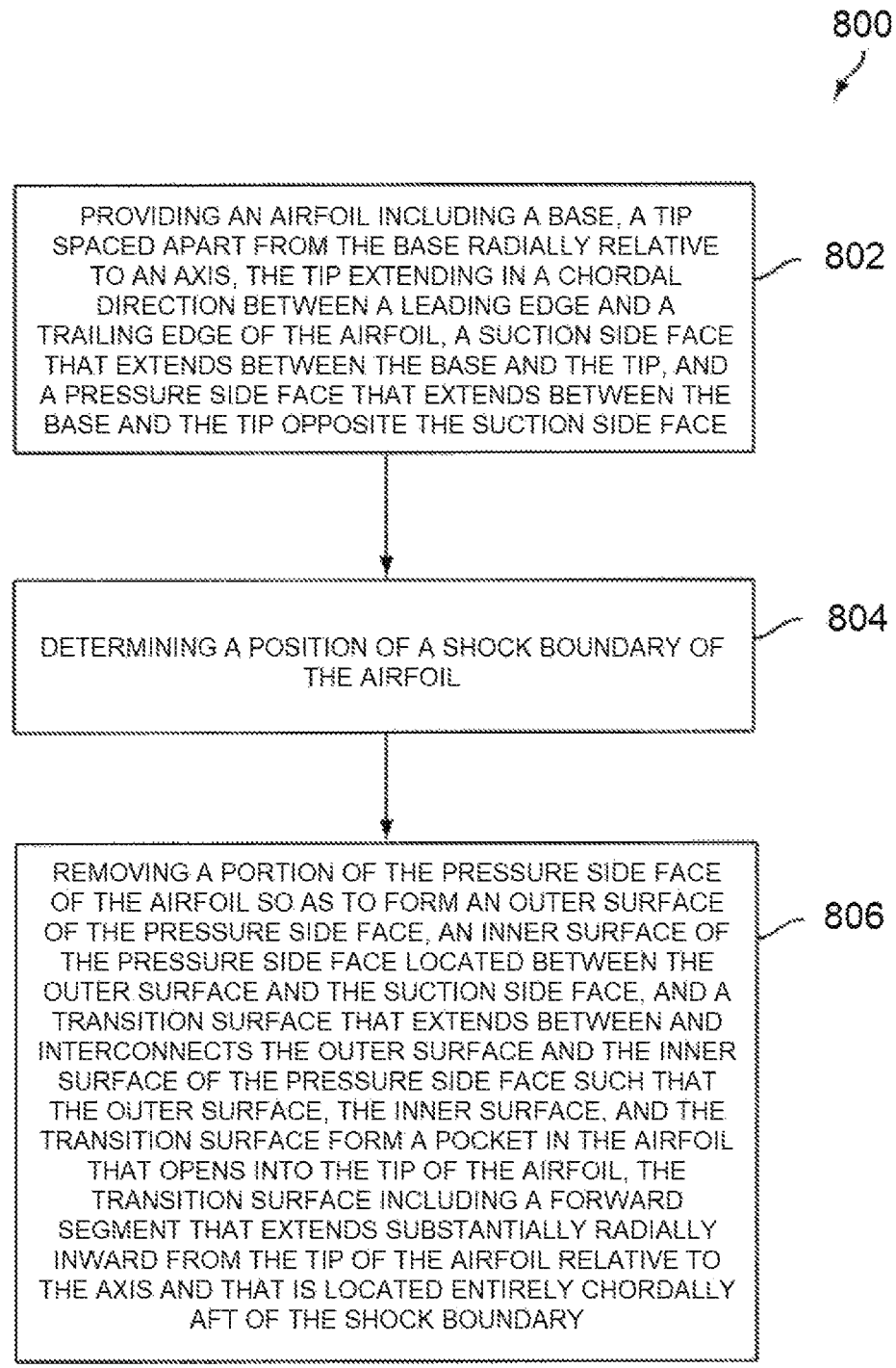
FIG. 9 is a simplified flow diagram showing one illustrative embodiment of a method disclosed herein.

A method 800 relating to the disclosed embodiments is shown in FIG. 9. The method 800 includes a first step 802 of providing an airfoil. The airfoil includes a base and a tip spaced apart from the base radially relative to an axis. The tip extends in a chordal direction between a leading edge and a trailing edge of the airfoil. A suction side face extends between the base and the tip, and a pressure side face extends between the base and the tip opposite the suction side face.

The method 800 further includes a second step 804 of determining a position of a shock boundary of the airfoil. As discussed above, oblique shock waves may occur near or at the pressure side of the airfoil and reflect between the casing and the tip of the airfoil during high speed operation. The shock boundary wave should not be interfered with by structural modifications of the airfoil, and accordingly, the pocket formed in the airfoil as will be discussed below is sized to be chordally aft of the shock boundary of the airfoil.

The method 800 further includes a third step 806 of removing a portion of the pressure side face of the airfoil so as to form an outer surface of the pressure side face, an inner surface of the pressure side face located between the outer surface and the suction side face, and a transition surface that extends between and interconnects the outer surface and the inner surface of the pressure side face. The outer surface, the inner surface, and the transition surface form a pocket in the airfoil that opens into the tip of the airfoil. The transition surface includes a forward segment. The forward segment extends substantially radially inward from the tip of the airfoil relative to the axis and, as discussed above, is located entirely chordally aft of the shock boundary.

The transition surface further includes an aft segment and a joint segment. The aft segment extends radially inward from the tip of the airfoil, is located a first distance chordally forward of the trailing edge of the airfoil that is equal to a range of thirty to forty percent of a chordal extent of the tip of the airfoil. The joint segment interconnects the forward segment and the aft segment. The joint segment includes a first portion that extends radially inward and chordally aft away from the forward segment and a second portion that extends radially inward and chordally forward away from the aft segment toward the first portion. The first portion and the second portion converge into one another.

The third step 806 of removing may further include removing a portion of the pressure side face so as to form the forward segment, the aft segment, and the joint segment of the pocket of the airfoil such that impact capabilities, weight reduction, and aerodynamic losses of the airfoil are optimized.

The present disclosure relates to intentionally designing the shape of a mass removed pocket and encompassing design methods to minimize the negative effects from impact and/or containment and aerodynamics with specific features. The mass removed pocket shape may resemble a rectangle towards the tip of the airfoil with the base forming a triangle. The tip of the triangle base may form the furthest radial extent of the mass removed pocket and may be free to move as needed to best suit the impact, aerodynamic, and mechanical needs of the airfoil in question. The mass removed pocket may be machined into the pressure face of the airfoil. A general arrangement of different forms of this shape are disclosed herein.

Fan blades may be the foremost rotating components of a gas-turbine engine. In addition to the inflowing air, these blades may be exposed to ingested foreign bodies, such as birds. These blades may be configured to withstand extremely high loads, in the event of a bird strike. A reduction in weight at the tip of the fan blade, apart from the aspect of weight savings, can improve vibration amplitudes and vibration behavior, and reduce centrifugal forces which ultimately increase mechanical strength of the fan blade or blisk. Implementation of weight reduction which does not modify the external airfoil, such as internal tip slots is costly to implement. The present disclosure relates to an external pocket to remove weight from the blade so that it can be easily implemented into new or existing airfoils as needed. The shape of the pocket may mitigate aerodynamic performance loss and withstand impact loading. Utilizing this method of mass removal may also be used to adjust blade frequencies.

The geometry of the mass removed pocket may be positioned so that it does not interfere with the aerodynamic shock boundary of the airfoil, nor negatively affect impact capabilities. The pocket starts aft along the chord of the shock boundary to minimize disruption. The chordal length of the pocket ends at a position which has been analytically optimized for impact capability. There is an inverse relationship between pocket chordal length and impact capability.

The geometry of the mass removed pocket may be positioned on the pressure face of the airfoil. The geometry of the mass removed pocket may be designed such that it does not interfere with the containment and impact capability of the blade. As the radial extend of the mass removed pocket goes lower, impact capability may be reduced. The radial extend may be designed to the limits of impact capability.

The geometry of the mass removed pocket may be designed to maximize weight reduction at the highest radial extent on the airfoil. As such, the geometry may be designed with a rectangular form near the tip to a depth determined to not negatively affect impact capability at worst case manufacturing tolerances.

The geometry of the mass removed pocket may be designed so that the radial bottom of the pocket formed with a rounded triangle such that the sides are angled inward chordally, away from the leading edge and trailing edge of the airfoil. This intentional shape may serve to further optimize weight reduction toward the furthest radial extent possible while also minimizing stress concentration features which can have a negative impact on the impact capability of the airfoil during medium bird loading.

The disclosed embodiments enable a pocket to be machined into existing airfoils or designed into the airfoil section shape from the start. The disclosed embodiments maximize weight reduction while maintaining impact and containment capability of the airfoil and minimizing potential aerodynamic performance reductions. The mass removal can also be used for blade frequency adjustment. The designs methods and cardinal shape may be flexible enough to accommodate differences in airfoil shape.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An airfoil adapted for use in a gas turbine engine, the airfoil comprising
    a base,
    a tip spaced apart from the base radially relative to an axis, the tip extending in a chordal direction between a leading edge and a trailing edge of the airfoil,
    a suction side face that extends between the base and the tip, and
    a pressure side face that extends between the base and the tip opposite the suction side face, the pressure side face including an outer surface, an inner surface located between the outer surface and the suction side face, and a transition surface that extends between and interconnects the outer surface and the inner surface of the pressure side face so as to form a pocket in the airfoil that opens into the tip of the airfoil,
    wherein the transition surface includes a forward segment that extends substantially radially inward from the tip of the airfoil relative to the axis and that is located entirely chordally aft of a shock boundary of the airfoil, an aft segment that extends substantially radially inward from the tip of the airfoil, and a joint segment that interconnects the forward segment and the aft segment, and
    wherein a chordal extent of the pocket is greater than a radial extent of the pocket.

2. The airfoil of claim 1, wherein the joint segment includes a first portion that extends radially inward and chordally aft away from the forward segment and a second portion that extends radially inward and chordally forward away from the aft segment toward the first portion such that the first portion and the second portion converge into one another such that the forward segment, the aft segment and the joint segment delimit the inner surface in the chordal direction and in the radial direction away from the tip of the airfoil.

3. The airfoil of claim 2, wherein the transition surface further includes:

a first junction segment located between and interconnecting the forward segment and the first portion of the joint segment, a second junction segment located between and interconnecting the aft segment and the second portion of the joint segment, and a third junction segment located between and interconnecting the first portion and the second portion of the joint segment.

4. The airfoil of claim 3, wherein the forward segment, the aft segment, the first portion of the joint segment, and the second portion of the joint segment are substantially linear, wherein the first junction segment is curved such that the forward segment, the first junction segment, and the first portion of the joint segment form a fillet shape, wherein the second junction segment is curved such that the aft segment, the second junction segment, and the second portion of the joint segment form a fillet shape, and wherein the third junction segment is curved such that the first portion of the joint segment, the third junction segment, and the second portion of the joint segment form a fillet shape.

5. The airfoil of claim 4, wherein the leading edge of the airfoil defines a top portion that extends from the tip of the airfoil a distance that is equal to a length of the forward segment, and wherein the forward segment is substantially parallel with the top portion of the leading edge.

6. The airfoil of claim 3, wherein the forward segment, the aft segment, the first portion of the joint segment, and the second portion of the joint segment are substantially linear, wherein the first junction segment is linear such that the forward segment, the first junction segment, and the first portion of the joint segment form a substantially straight line, wherein the second junction segment is curved such that the aft segment, the second junction segment, and the second portion of the joint segment form a fillet shape, and wherein the third junction segment is curved such that the first portion of the joint segment, the third junction segment, and the second portion of the joint segment form a fillet shape.

7. The airfoil of claim 6, wherein the leading edge of the airfoil is curved and defines a top portion that has a radial extent from an outer end of the top portion located at the tip of the airfoil to an inner end of the top portion that is equal to a radial extent of the forward segment and the first portion of the joint segment, and wherein the forward segment and the first portion of the joint segment are substantially parallel with a secant line of the curve of the leading edge that runs from the outer end of the top portion to the inner end of the top portion.

8. An airfoil adapted for use in a gas turbine engine, the airfoil comprising
a base,
a tip spaced apart from the base radially relative to an axis, the tip extending in a chord direction between a leading edge and a trailing edge of the airfoil, and
a first face that extends between the base and the tip and includes an outer surface, a recessed inner surface, and a transition surface that extends between and interconnects the outer surface and the inner surface of the first face so as to form a pocket in the airfoil,
wherein the transition surface includes a substantially linear forward segment that extends radially inward from the tip of the airfoil relative to the axis and that is located entirely chordally aft of a shock boundary of the airfoil, an aft segment that extends radially inward from the tip of the airfoil, and a joint segment that interconnects the forward segment and the aft segment, and
wherein the substantially linear forward segment is disposed at a non-orthogonal angle with respect to a vertical axis that is approximately aligned with the shock boundary of the airfoil.

9. The airfoil of claim 8, wherein the aft segment is spaced apart chordally forward from the trailing edge of the airfoil by a distance equal to about thirty to forty percent of a length of the tip of the airfoil.

10. The airfoil of claim 9, wherein the joint segment includes a first portion that extends radially inward and chordally aft away from the forward segment and a second portion that extends radially inward and chordally forward away from the aft segment toward the first portion such that the first portion and the second portion converge into one another.

11. The airfoil of claim 10, wherein the transition surface further includes:
a first junction segment located between and interconnecting the forward segment and the first portion of the joint segment,
a second junction segment located between and interconnecting the aft segment and the second portion of the joint segment, and
a third junction segment located between and interconnecting the first portion and the second portion of the joint segment.

12. The airfoil of claim 11, wherein the forward segment, the aft segment, the first portion of the joint segment, and the second portion of the joint segment are substantially linear, wherein the first junction segment is curved such that the forward segment, the first junction segment, and the first portion of the joint segment form a fillet shape, wherein the second junction segment is curved such that the aft segment, the second junction segment, and the second portion of the joint segment form a fillet shape, and wherein the third junction segment is curved such that the first portion of the joint segment, the third junction segment, and the second portion of the joint segment form a fillet shape.

13. The airfoil of claim 12, wherein the leading edge of the airfoil defines a top portion that extends from the tip of the airfoil a distance that is equal to a length of the forward segment, and wherein the forward segment is substantially parallel with the top portion of the leading edge.

14. A method comprising
providing an airfoil including a base, a tip spaced apart from the base radially relative to an axis, the tip extending in a chordal direction between a leading edge and a trailing edge of the airfoil, a suction side face that extends between the base and the tip, and a pressure side face that extends between the base and the tip opposite the suction side face,
determining a position of a shock boundary of the airfoil, and
removing a portion of the pressure side face of the airfoil, based on the determined position of the shock boundary of the airfoil, so as to form an outer surface of the pressure side face, an inner surface of the pressure side face located between the outer surface and the suction side face, and a transition surface that extends between and interconnects the outer surface and the inner surface of the pressure side face such that the outer surface, the inner surface, and the transition surface form a pocket in the airfoil that opens into the tip of the airfoil, the transition surface including a forward segment that extends substantially radially inward from the tip of the airfoil relative to the axis and that is located entirely chordally aft of the shock boundary.

15. The method of claim 14, wherein the transition surface further includes an aft segment and a joint segment, the aft segment extends radially inward from the tip of the airfoil and is located a first distance chordally forward of the trailing edge of the airfoil that is equal to a range of thirty to forty percent of a chordal extent of the tip of the airfoil, and the joint segment interconnects the forward segment and the aft segment, the joint segment including a first portion that extends radially inward and chordally aft away from the forward segment and a second portion that extends radially inward and chordally forward away from the aft segment toward the first portion such that the first portion and the second portion converge into one another.

16. The method of claim 15, wherein the removing includes removing a portion of the pressure side face so as to form the forward segment, the aft segment, and the joint segment of the pocket of the airfoil such that impact capabilities, weight reduction, and aerodynamic losses of the airfoil are optimized.

17. The airfoil of claim 1, wherein the forward segment is substantially linear and is disposed at a non-orthogonal angle with respect to a vertical axis that is approximately aligned with the shock boundary of the airfoil.

18. The airfoil of claim 3, wherein each of the first portion and the second portion is substantially linear, and wherein an angle formed therebetween at the third junction is approximately in the range of about 80 degrees to about 120 degrees.

19. The airfoil of claim 8, wherein a chordal extent of the pocket is greater than a radial extent of the pocket.

20. The airfoil of claim 11, wherein each of the first portion and the second portion is substantially linear, and wherein an angle formed therebetween at the third junction is approximately in the range of about 80 degrees to about 120 degrees.

* * * * *